United States Patent [19]

Bouwman

[11] 4,135,580

[45] Jan. 23, 1979

[54] PLANT EXTRACTOR

[75] Inventor: Aries Bouwman, Wageningen, Netherlands

[73] Assignee: Drost Machines B.V., Rhenen, Netherlands

[21] Appl. No.: 736,848

[22] Filed: Oct. 29, 1976

[30] Foreign Application Priority Data

Oct. 29, 1975 [NL] Netherlands ................. 7512656

[51] Int. Cl.² ........................................... A01D 25/00
[52] U.S. Cl. ................................................ 171/61
[58] Field of Search ................ 171/55, 60, 61; 56/33

[56] References Cited

U.S. PATENT DOCUMENTS

| | | | |
|---|---|---|---|
| 1,285,529 | 11/1918 | Wilson | 171/61 |
| 3,262,503 | 7/1966 | Zijlstra et al. | 171/61 |
| 3,984,968 | 10/1976 | Fowler | 56/33 |

FOREIGN PATENT DOCUMENTS 1132644  11/1956  France ................................ 171/61

Primary Examiner—Russell R. Kinsey
Attorney, Agent, or Firm—Fleit & Jacobson

[57] ABSTRACT

A travelling machine for pulling off green plants or stalks from subterraneous potatoes and like tuberous crops. The machine has a pair of endless belts of which two contacting runs together move in a direction opposite to the direction of travel of the machine, engage the plants and extract them at a constant rate of pull relative to the ground with varying speeds of the machine.

20 Claims, 8 Drawing Figures

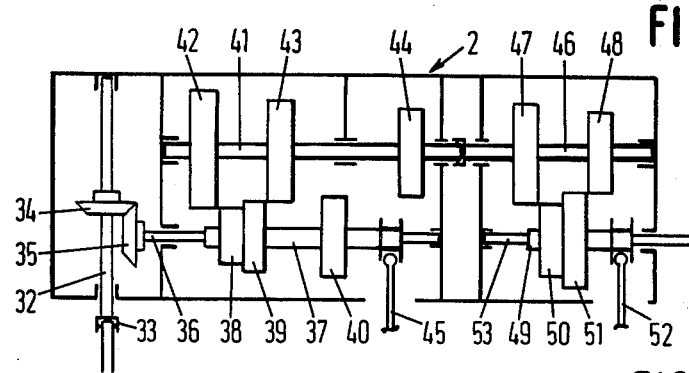
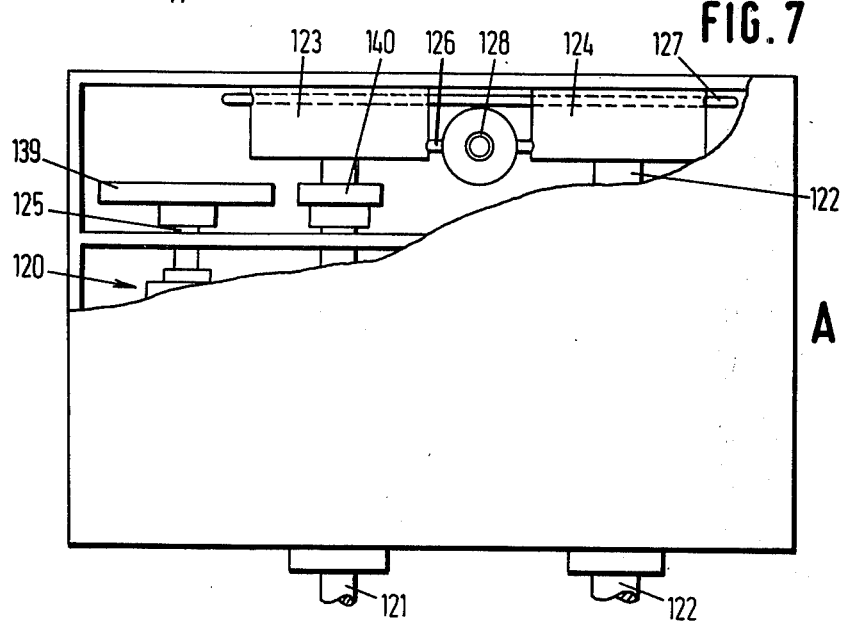
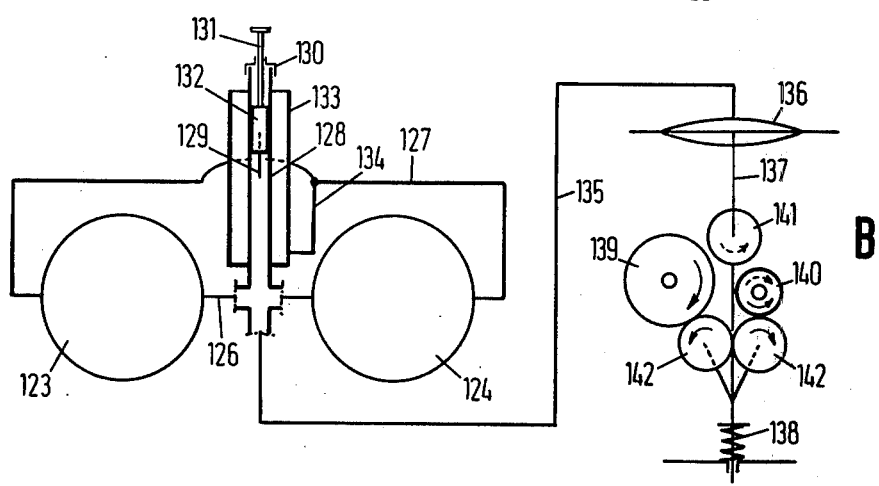

PLANT EXTRACTOR

This invention relates to a travelling machine for pulling off green plants from tuberous crops which remain in the ground during the operation, in particular the plants of seed potatoes, the machine being arranged to be moved by a travelling frame or a tractor in a direction of advance, and comprising plant extracting elements.

In harvesting many kinds of bulbous and tuberous crops, it is common practice first to remove the tops of the plants, i.e. the green parts of the plants that grow above the ground. In certain cases, there will be a considerable time interval between the removal of the green plants and the digging up of the crops. This is in particular the case with seed potatoes, which are to be harvested in an early stage of tuber development. In that stage the skin of the potatoes is still very vulnerable, which is why the potatoes are left in the ground for an additional period of many days to allow the skin to become strengthened. Another reason for removing the green plants of seed potatoes a considerable time before the potatoes are harvested themselves is the necessity of preventing the potatoes from becoming infected with a viral disease. This infection may be the result of the green plant being infected with some virus or other, which infection may be transmitted to the potatoes through the sap in the stalks of the plant. To prevent this danger, authorities will often set a date on which the green plants must be removed.

To prevent the risk of infection as much as possible, the green plants should be fully removed from the seed potatoes, and be kept separate from them, while the potatoes remain in the ground.

Prior machines for this purpose especially have the drawback of meeting this latter requirement to an insufficient extent. There are prior machines which first chop off a portion of the plants and then pull off any remaining stalks still attached to the potatoes, which however, is effected incompletely. There are also prior machines which cut off the plants below the surface of the ground. In both cases hoeing means are shifted over the worked earth to ensure that the potatoes are well covered with earth. During this operation, however, green parts of the plants will be moved under the ground as well.

It is an objection of the invention to provide a machine of the type described, with which the green parts of the plants can be pulled off from the tuberous or bulbous crops with a high degree of completeness and certainty of definitive separation, both when the plants are grown in ridges and in flat beds.

According to the present invention, there is provided a machine for pulling off green plants from tuberous crops which remain in the ground during the operation, in particular the plants of seed potatoes, the machine being arranged to be moved by a travelling frame in a direction of advance, and comprising plant extracting members, characterized by at least two plant extracting members in the form of endless belts each arranged to be driven in an endless orbit and having a confluent path of cooperation for clamping plants between them, said plant extracting members, in their confluent path, moving entirely or substantially entirely in horizontal direction opposite to the direction of travel of the machine and at a speed higher than the speed of travel of the machine.

Owing to the horizontal pulling forces produced by the machine, the potatoes remain in the ground. This is especially so when, in accordance with a preferred feature of the invention, earth compacting means are provided on opposite sides of the common path of the extraction members. The earth compacting members are preferably mounted for rotation on supporting shafts. The shafts are adjustable in height. Normally they are placed at an angle to the horizontal, which angle is preferably adjustable, so that the position of the earth compacting members can be adapted to the profile of earth ridges when the bulbous or tuberous crops, such as seed potatoes, are grown therein, as they customarily will.

The earth compacting members are driven for rotation by the ground as a result of frictional forces. Suitable earth compacting members are a pair of rollers disposed in the zone where the extraction members begin to become effective, on opposite sides of the common path referred to. Immediately thereafter, one or more further pairs of rollers may be arranged in succession. It is also possible to have an endless compacting belt run around a front and a rear compacting rollers on opposite sides of the common path. As the greatest compacting force, and the most important one as far as the contemplaced effect is concerned, is to be suplied at the beginning of the common path, a single pair of compacting rollers will suffice in many cases, possibly followed by compacting skids, which, like the rollers, are adjustable in height and in angular position.

The extraction members preferably consist of two endless belts which in their common path are pressed together by guide rollers. Preferably the guide rollers cause the belts to follow a somewhat circuitous path in that part of their orbit.

In a particularly effective embodiment of the invention, the extraction members, in the form of endless belts, are jointly guided in a zig-zag path in their common path of cooperation by guide rollers. As a consequence, the stalks are also moved to and fro in a horizontal direction transverse to the direction of travel of the machine.

Another important feature of the invention resides in that the transmission gear for the drive of the extraction members is arranged to give the extraction members, in their common path, a constant, or virtually constant, pre-determined velocity relative to the ground over which the machine advances. By virtue of this arrangement, the velocity of the extraction elements relative to the ground, referred to herein as the extraction speed, can always be kept at the most favourable value, for example, 2 to 3 kilometers per hour, which can be varied depending on the nature of the crop and the soil.

The adjustability of the transmission ratios can be effected in various ways, e.g. by manually adjusting a gear transmission or a variator, or automatically, partly depending on the rotary speed of the power take-off shaft of the tractor, which speed is proportional to the velocity of the tractor. Automation can be effected under the control of means for sensing the difference in speed of certain shafts, such as by means of the voltage differential of electrical voltage generators coupled with these shafts, or generators pneumatically or hydraulically determining voltage or pressure or volume. It is also possible to use a centrifugal regulator for the purpose, which effects control on the basis of keeping constant the orbital speed of a satellite wheel in a differential gear.

Some embodiments of the invention will now be described, by way of example, with reference to the accompanying drawings. In said drawings, FIG. 1 is a sideview of one embodiment of a machine according to this invention;

Figure 6:
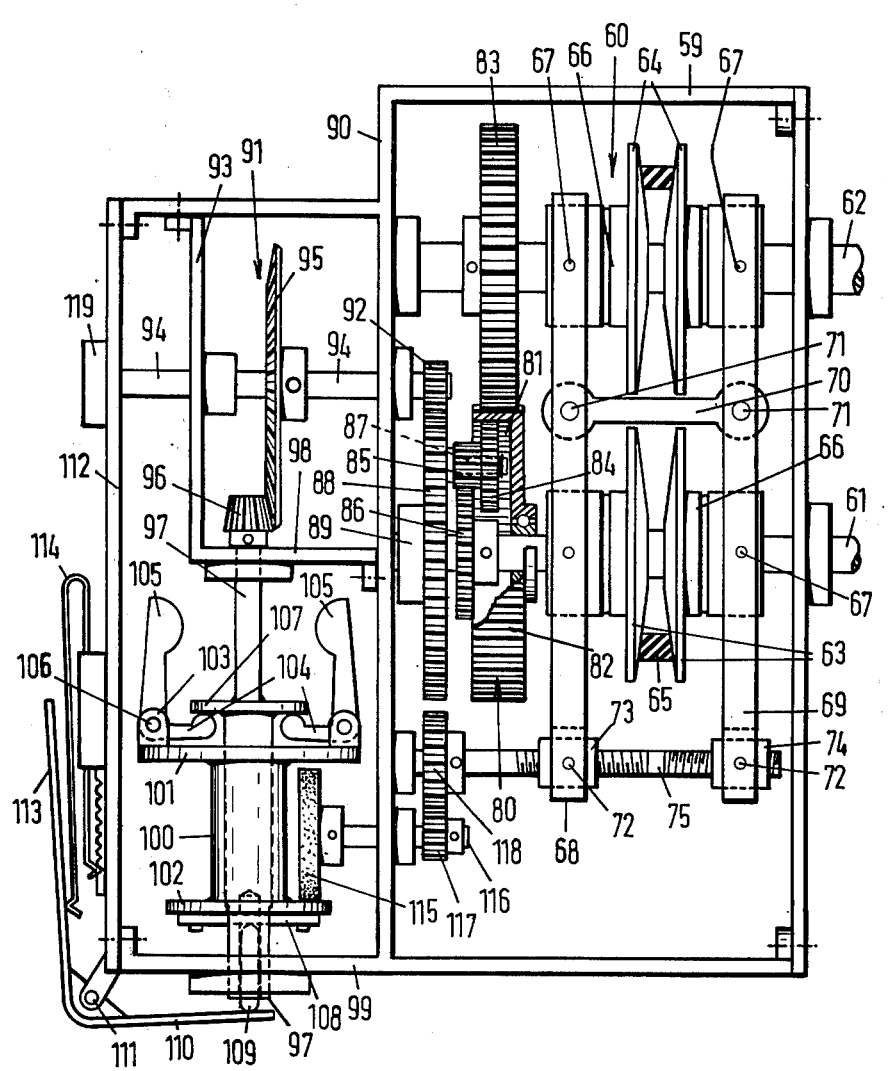

FIG. 5 diagrammatically shows a transmission gear;

FIG. 6 is a part-sectional elevation of a different transmission gear; and

FIG. 7A shows a plan view with portions broken away of still another transmission gear.

FIG. 7B shows an elevational view of the transmission gear shown in FIG. 7A.

Referring to the drawings, there is shown a frame, generally indicated at 1, which in a conventional manner, not shown, can be attached to a tractor that is provided with a power take-off shaft to provide the driving force for the moving parts of the machine through transmission box 2. Indicated by a point 3 where broken centerlines cross is the place of a transverse transmission shaft for driving a plurality of similar machines mounted on a single frame or on coupled frames, so that two or more rows of potato plants planted in ridges can be treated in one run.

Extending downwardly from transmission box 2 are two vertical shafts 4 only one being illustrated, each carrying at their bottom end a pulley 5 about which are trained endless belts 6 that are also trained about pulleys 7 at the other end of the machine, which are carried by vertical shafts 8. Shafts 4 and 8 also carry sprockets 9 and 10, about which is trained a chain 11. Shafts 4 and 8 are carried by frame 1 by means of bearing supports 12 and 13, respectively.

The contacting runs of belts 6, which constitute plant extracting members, are forced to run in a zig-zag path in their confluent portion of their orbit. In addition to the advantage that they are firmly in contact with each other; this has the effect that the extraction elements pull engaged stalks to and fro transversely to the direction of travel. Pulling the stalks of the plants in the direction of travel as well as transversely to that direction highly promotes detaching the stalks from the tubers without the latter being damaged.

Carried by longitudinal beams 15 of frame 1 are two shaft carriers 16, which can be selectively fixed at various heights by means of bolts 17 extending through vertical slots therein. The two carriers 16 have mutually converging lower ends 18 each carrying a shaft 19 journalling a compression roller 20 for free rotation around said shafts. Rollers 20 have a flange 21 at their upper end. The angle between carriers 16 and their lower ends 18 carrying the shafts may be made adjustable, so that the angle of inclination of rollers 20 is also adjustable.

As the angles of the profile of ridges 22 are generally standardized, angular adjustability of rollers 20 is often unnecessary, which is why angle adjusting means for shaft carriers 16, 18 are not shown in the embodiment illustrated. If other angles of inclination of rollers 20 should be necessary all the same, it may suffice to replace carriers 16, 18 by like carriers formed with a different angle.

Mounted for rotation at the front end of the machine, journalled in arms 23 secured to frame 1, are two conical plant erecting rollers 24 for putting the plants in an upright position before they are engaged between the extraction members or belts 6. Plant erecting rollers 24 are driven in opposite directions by means of friction rollers 25 in frictional contact with pulleys 5.

Figure 1:
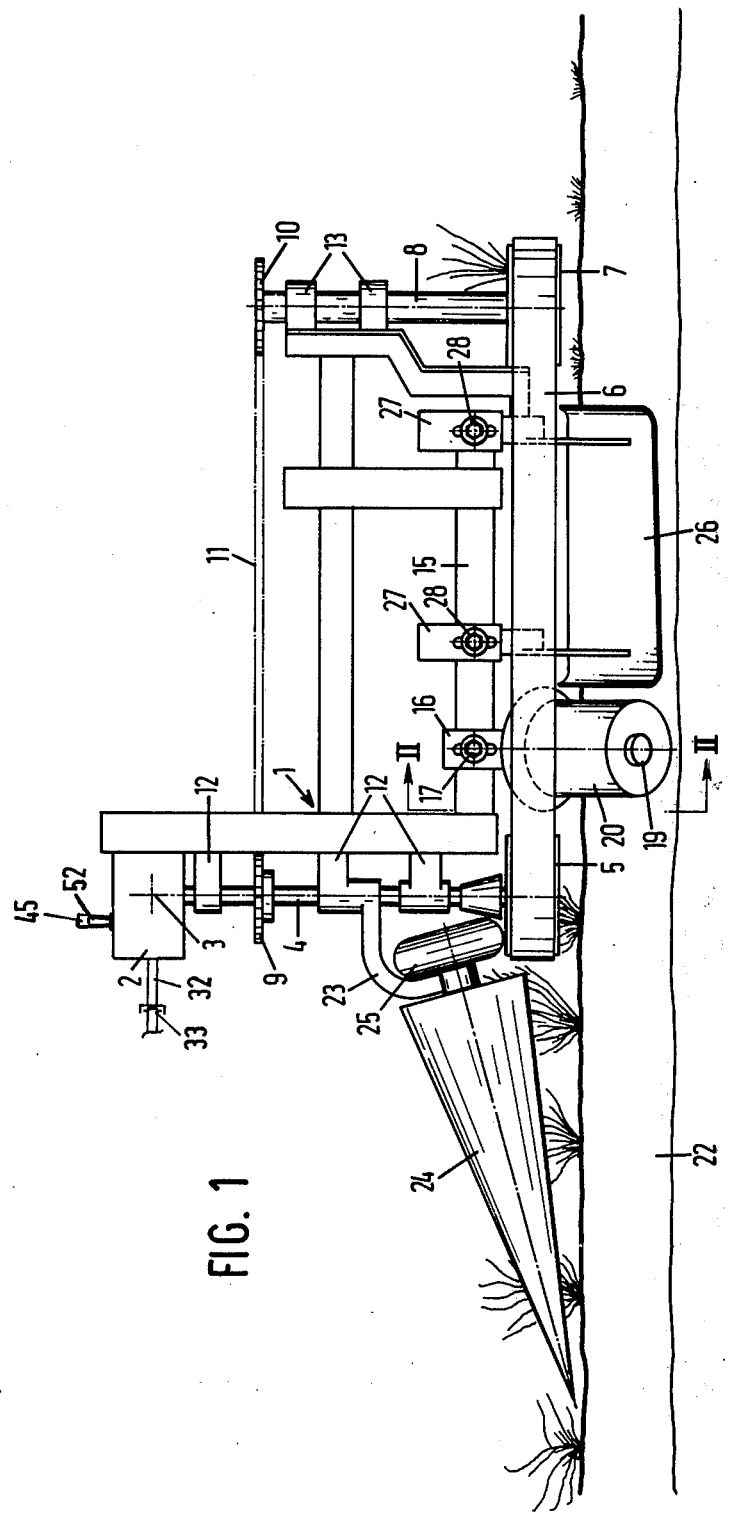
Figure 2:
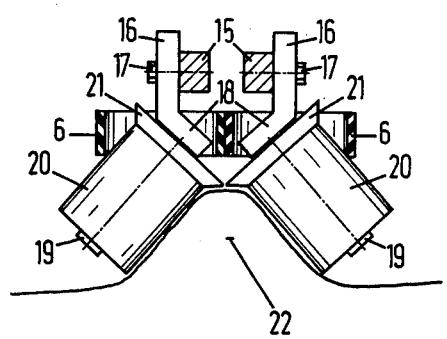
FIG. 2 is a cross-sectional view on the line II—II of FIG. 1.
Figure 3:
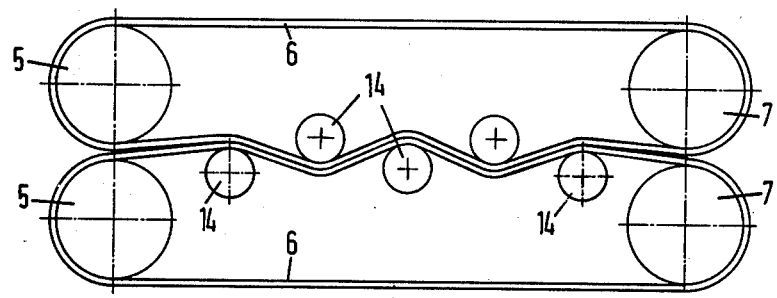
FIG. 3 is a separate plan view of a pair of plant extracting elements with guide rollers.

In the embodiment of FIG. 1, rollers 20 are followed by two compression skids 26 also mounted on beams 15 for vertical adjustment by means of carriers 27 and screw bolts 28 extending through slots therein. Skids 26 keep ridges 22 under pressure and are disposed first behind rollers 20.

Instead of skids 26, additional pairs of rollers 20 may be used, succeeding one another in the direction of travel.

Figure 4:
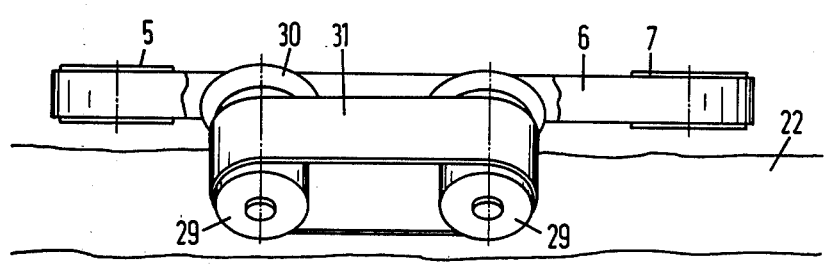
FIG. 4 shows a detail of a different embodiment.

FIG. 4 shows a modified embodiment, differing from the first only to the extent that a pair of spaced, freely rotatable compression rollers 29 with flanges 30 are mounted on each side of the frame, about which rollers are trained endless belts 31 with which ridges 22 are kept under pressure. If desired, the lower run of belts 30 may be supported with support elements.

When potato plants are extracted with the machine the seed potatoes will be kept firmly in the soil ridges, and the soil will get little opportunity of being worked up.

A few possibilities of controlling the extraction speed relative to the ground, i.e., so as to keep it constant with varying speeds of travel of the machine, will now be described with reference to FIGS. 5, 6 and 7.

FIG. 5 diagrammatically illustrates a portion of gear box 2, with its cover being removed to show a gear mechanism having a variable gear ratio. A shaft 32 with a universal joint 33 can be coupled to the power take-off shaft of a tractor. Bevel gears 34 and 35 transmit the drive to a shaft 36, to which a sleeve is keyed for sliding movement thereon and for rotation along with it. Fixedly mounted on a sleeve 37 are gearwheels 38, 39, 40 of different sizes. Fixedly mounted on a shaft 41 are likewise three differently sized gearwheels 42, 43, 44. By means of an operating lever 45, which with a bifurcated end engages between collars of sleeve 37, pairs of gearwheels 38, 42, or 39, 43, or 40, 44 can alternatively be thrown into engagement, so that there is a choiche between three transmission ratios. In order that the selected ratio may be varied to suit requirements, there is provided a second variable gear with two transmission ratios, which comprises gear wheels 47 and 48 fixedly mounted on a shaft 46 coupled with shaft 41, and arranged to be respectively brought into engagement with gearwheels 50 and 51 mounted on a sleeve 49. To this effect, sleeve 49 is keyed to a shaft 53, so as to be restrained from rotation relative to it, and slidable thereon by means of a handle 52. Shaft 53 is coupled to the transverse shaft indicated by 3 in FIG. 1. Adjustment with handle 45 serves for adaptation to the selected speed of the tractor, and adjustment with handle 52 for adaptation to the nature of the plants and the soil. Naturally, gears with more transmission ratios can be used.

FIG. 6 shows a transmission device which can be used instead of the variable gears shown in FIG. 5.

FIG. 6 shows a variator 60 having mainshafts 61 and 62 journalled in a housing 59, and having pairs of adjustable conical pulleys 63 and 64, respectively, between which runs a V-belt 65. Pulleys 63, 64 are coupled with their shafts so as to rotate along with the latter and to be slidable thereon. For opposite adjustment of their axial distances, they are coupled, both in the same way, by means of thrust bearing blocks 66 and trunnions 67 to a pair of levers 68 and 69, which are articulated together with a rod 70 and trunnions 71. At one end, levers 68, 69 are coupled by means of trunnions 72 to nuts 73 and 74, respectively, which are threaded in opposite senses, and which have been screwed on a shaft having corresponding screwthreads. When shaft 75 is turned, the transmission ratio of variator 60 is adjusted. The end (not shown) of shaft 61 can be coupled through a universal joint to the power take-off shaft of a tractor, and the end (not shown) of shaft 62 can drive a transverse transmission shaft, corresponding to shaft 3 in FIG. 1, by means of two bevel gears.

The variator is controlled automatically through shaft 75, supposing that the rate of rotation of shaft 61, which is coupled to the power take-off shaft is a measure for the speed of travel of the tractor, whose engine drives both its road wheels and its power take-off shaft.

Mounted on shaft 61 is a differential gear comprising a wheel 80 having inner teeth 81 and outer teeth 82. Wheel 80 is mounted for free rotation on shaft 61. Its outer teeth 82 are in engagement with a gearwheel 83, which has the same pitch circle as teeth 82 and is fixedly mounted on shaft 62. The inner teeth 81 are in engagement with a gearwheel 84, which is integral with a gearwheel 85, which is in engagement with a gearwheel 86 fixedly mounted on shaft 61. Gears 84, 85 are freely rotatable as a satellite system on a trunnion 87 secured to a satellite carrying disk 88, journalled for free rotation on shaft 61 through bearing 89. The pitch circle ratio of gears 85 and 86 is equal to that of gear 84 and the inner teeth 81, so that when disk 88 is stationary, shaft 61 and wheel 80 have the same, but opposite rotary speed, so that gear 83 and shaft 62 have the same angular velocity as shaft 61. When the transmission ratio between shafts 61 and 62 is varied, disk 88 has to rotate at a speed which is a measure for the difference in speed of shafts 61 and 62. A control unit, indicated generally by 91, mounted on a wall 90 of housing 59 controls shaft 75 so that the difference in speed of shafts 61 and 62 remains constant when the input velocity imparted to shaft 61 is varied.

The control unit is driven by the teeth of disk 88, which are in engagement with a pinion 92 on a shaft 94 journalled in wall 90 and in an auxiliary wall 93. Fixedly mounted on shaft 94 is a bevel gear 95, which is in engagement with a bevel pinion 96 on one end of a shaft 97 that is journalled in walls 90 and 93 and consists of two parts of different diameter. Slidably mounted on the thicker part of shaft 97 is a sleeve 100 having flanges 101 and 102. Welded to flange 101 are lugs 103, to which are pivoted, at 106, bell crank levers formed by arms 104, 105. Arms 104 engage between flange 101 and a disk 107 welded to shaft 97. Arms 105 are formed as centrifugal weights. Secured to flange 102 is a rod 108, which extends through a transverse slot in shaft 97, thereby coupling sleeve 100 to shaft 97 in a rotary sense. Secured in an axial bore at the end of shaft 97 is a pin 109, which is biased against rod 108 by means of an arm 110 of a bell crank lever pivoted to the housing 112 of control unit 91 at 111, the other arm 113 of the lever being spring-loaded by a leaf spring 114 bent upon itself. Spring 114 is adjustable in the longitudinal direction of arm 113, so that the effect of spring 114, and hence the difference in speed of shafts 61 and 62, which is to be kept constant, is adjustable. When there is no equilibrium between the forces derived from spring 114 and from centrifugal weights 105 and acting on sleeve 100, the latter will move in one direction or the other, and through frictional contact of flange 101 or 102 will rotate a friction wheel 115 on a shaft 116, which through pinions 117 and 118 rotates shaft 75, whereby the variator is adjusted until the equilibrium of forces and the determined difference in speed between shafts 61 and 62 are restored.

Mounted at the end of shaft 94, the speed of which is a measure for the difference in speed between shafts 61 and 62, is a tachometer 119, which indicates this difference in speed.

In the embodiment of FIG. 7, which has two parts 7a and 7b, a variator 120, corresponding to variator 60 of FIG. 6, is combined with a different control mechanism.

Mounted on shafts 121 and 122, which correspond to shafts 61 and 62, respectively, in FIG. 6, are gear pumps 123 and 124, respectively, whose output of oil serves for regulating the variator through shaft 125, which corresponds to shaft 75 in FIG. 6.

Pumps 123 and 124, which are identical, have an equal output capacity at equal speeds. The outlet of pump 124 is connected through a conduit 126 to the inlet of pump 123, the outlet of which is connected through a conduit 127 to the inlet of pump 124. Connected to conduit 126 is a vertical tube 128, the wall of which has an elongated narrow slit 129. The upper end of tube 128 is closed with a stop 130, which has a threaded bore in engagement with a threaded rod 131 carrying a piston 132, which partly covers slit 129. Tube 128 is housed, with an interspace, in a tube 133, which through a branch pipe 134 is connected to conduit 127.

Pumps 123 and 124 circulate oil. As shaft 132 rotates faster than shaft 121, pump 124 delivers more oil than pump 123. The difference in output quantity is a measure for the difference in speed between shafts 121 and 122.

The differential quantity of oil goes through tube 128, the exposed part of slit 129, tube 133, conduit 134, and conduit 127 back to the inlet of pump 124.

As slit 129 offers flow resistance, fluid pressure will be built up in tubes 126 and 128, which through branch pipe 135 is transmitted to the control means for adjusting shaft 125. When the differential quantity of oil per unit of time is constant, a given position of piston 132 will result in a given, constant pressure within tube 128, which hence is a measure for the difference in speed between shafts 121 and 122. At pressures different from this given pressure, the control means react until the given pressure and hence the same difference in speed have been restored.

By adjusting piston 132, the operator can select a different difference in speed.

The control means will now be described with particular reference to FIG. 7b.

Conduit 135 transmits the oil pressure to a diaphragm box 136, which presses down a rod 137 against the action of a spring 138. Mounted on shaft 125 is a friction disk 140, and on shaft 121 a friction disk 140. Mounted for free rotation on rod 137 is a small friction roller 141, which when rod 137 is lowered is pressed against disks 139 and 140 to couple the latter in opposite senses of rotation until the selected difference in speed is restored.

Mounted on rod 137 for free rotation are further two identical friction disks 142, which are in engagement through friction or possibly through equal teeth. When rod 137 is pressed upwards by spring 138 friction disks 142 couple disks 139 and 140 in the same sense of rotation until the selected difference in speed is again reached.

The means for controlling the rate of extraction relative to the speed of travel, as described, can also be used in cases in which there should be more of a vertical pull on the plants, or when the plants are to be pulled substantially vertically.

I claim:

1. A machine adapted to be moved in a given direction for pulling off green plants from tuberous crops which remain in the ground during the operation of the machine, in particular the plants of seed potatoes, said machine comprising: a frame; at least two plant extracting members comprised of endless belts supported by said frame in such manner that longitudinally-extending first portions of the belts face each other and longitudinally-extending second portions of the belts face away from each other, said endless belts being driveable in opposite directions in an endless substantially horizontal orbit and having a confluent path in which said first portions cooperate with each other for clamping plants therebetween, said plant extracting members, in their confluent path, being movable entirely or substantially entirely in a horizontal direction opposite to the direction of travel of the machine and at a speed higher than the speed of travel of the machine; means supported by said frame and having portions spaced from the second portions of said plant extracting members for compressing the ground on opposite sides of said confluent path; and means supported by said frame and positioned, in the direction of travel, in front of said first portions of the belts for moving tops of plants into an upright position in the region of said confluent path so that the plant tops are engageable by the plant extracting members.

2. A machine according to claim 1, further comprising guide means including guide rollers supported by said frame for defining a zig-zag confluent path for said plant extracting members.

3. A machine according to claim 1, further comprising transmission means operatively associated with the plant extracting members for driving the plant extracting members so that, at different speeds of travel of the machine, the plant extracting members are given the same, or substantially the same, predetermined speed relative to the ground over which the machine advances.

4. A machine according to claim 3, wherein the machine is adapted to be connected to a tractor and the transmission means are arranged for setting two or more transmission ratios from a power take-off shaft of the tractor, so that the plant extracting members in their confluent path are given a rearward velocity exceeding the speed of travel of the tractor by approximately 2 to 3 km/hour.

5. A machine according to claim 4, further comprising additional "high/low" transmission adjusting means operatively associated with the plant extracting members for adapting the speed of the plant extracting members in their confluent path to particular requirements resulting from the nature of the plants or the ground.

6. A machine according to claim 3, wherein said transmission means include a transmission variator, infinitely adjustable between two end positions of adjustment.

7. A machine according to claim 3, wherein the transmission means further comprises control means for controlling the speed of said plant extracting members relative to the speed of travel of the machine.

8. A machine according to claim 6, wherein said variator includes an input shaft and an output shaft and wherein the machine further comprises measuring means for determining a difference in speed between the input shaft and the output shaft of said variator, and control means for adjusting said variator under the control of said measuring means.

9. A machine according to claim 8, characterized by generators respectively rotating at a rate proportional to the input shaft and the output shaft of the variator and generating signals proportional to their rate of rotation, the signals generated being compared with each other, and the control means being responsive to the difference between the signals generated by said generators.

10. A machine according to claim 8, wherein the measuring means includes an intermediate wheel carrier and differential gear means for controlling said wheel carrier, the differential gear means comprising a gear wheel rotatable in proportion to the input shaft of the variator and another gear wheel rotatable in proportion to the output shaft of the variator, and wherein the control means includes a centrifugal regulator connected to said intermediate wheel carrier and adjusting means regulated by said regulator for adjusting the variator.

11. A machine according to claim 8, wherein said measuring means includes a circulation circuit comprising two fluid-displacement pumps, one driven in proportion to the input shaft and the other in proportion to the output shaft of the variator, said pumps being connected in series in the circulation circuit, and a by-pass branching off between the pumps for circulation of a quantity of fluid displaced by one pump in excess of the other, said by-pass including flow restricting means for building up fluid pressure, and whereby said control means includes regulating adjustment means responsive to the fluid pressure built up by said flow restricting means for regulating adjustment of said variator.

12. A machine according to claim 9 wherein said signals are hydraulic signals.

13. A machine according to claim 9 wherein said signals are pneumatic pressure signals.

14. A machine according to claim 9 wherein said signals are electrical signals.

15. A machine according to claim 1, wherein the ground compressing means on opposite sides of the confluent path include shafts operatively associated with said frame and members supported for free rotation about said shafts.

16. A machine according to claim 1, wherein the ground compressing means on opposite sides of the confluent path include members adjustable in height and/or angular position.

17. A machine according to claim 1, wherein the ground compressing means comprise a pair of rollers disposed in the zone of the leading portion of the confluent path of the plant extracting members.

18. A machine according to claim 1, wherein the ground compressing means comprise a plurality of pairs of rollers disposed one behind the other.

19. A machine according to claim 1, wherein the ground compressing means comprise a pair of ground compressing rollers and a pair of ground compressing skids disposed, in the direction of movement behind the pair of ground compressing rollers.

20. A machine according to claim 1, wherein the ground compressing means comprise a pair of ground compressing rollers and ground compressing belts disposed around the pair of ground compressing rollers.

* * * * *